United States Patent
Dawson (10) Patent No.: US 7,334,744 B1
(45) Date of Patent: Feb. 26, 2008

(54) PORTABLE MISTER AND COOLING ASSEMBLY FOR OUTDOOR USE

(76) Inventor: Gentry Dawson, 12155 Riverside Dr., Valley Village, CA (US) 91607

( * ) Notice: Subject to any disclaimer, the term of this patent is extended or adjusted under 35 U.S.C. 154(b) by 0 days.

(21) Appl. No.: 11/438,827

(22) Filed: May 23, 2006

Related U.S. Application Data (60) Provisional application No. 60/683,324, filed on May 23, 2005.

(51) Int. Cl.
   - B05B 9/04 (2006.01)
   - B05B 15/06 (2006.01)
   - A61M 11/02 (2006.01)
   - A01G 25/02 (2006.01)

(52) U.S. Cl. .................. 239/373; 239/200; 239/276; 62/259.4

(58) Field of Classification Search ............... 239/373, 239/200, 276, 146, 147, 207–209, 266–269, 239/273, 279, 280–283, 289, 302, 329, 332, 239/333, 337, 355, 358, 360, 548, 556, 557, 239/566, 547; 62/259.4, 259.1, 304; 248/304, 248/339–341

See application file for complete search history.

(56) References Cited

U.S. PATENT DOCUMENTS

| | | | |
|---|---|---|---|
| 5,000,384 A * | 3/1991 | Arnold ..................... 239/128 |
| 5,598,719 A | 2/1997 | Jones et al. |
| 5,620,140 A | 4/1997 | Utter |
| 6,112,538 A | 9/2000 | Strussion |
| 6,175,969 B1 * | 1/2001 | Edwards ..................... 4/496 |
| 6,592,049 B1 * | 7/2003 | Wolput ..................... 239/70 |
| 6,886,759 B1 * | 5/2005 | Okronick et al. ........... 239/289 |
| 7,021,555 B2 * | 4/2006 | Bagnall ..................... 239/1 |
| 7,137,269 B1 * | 11/2006 | Maranville ................. 62/306 |
| 2005/0077391 A1 * | 4/2005 | Powell et al. ............. 239/373 |
| 2005/0082390 A1 * | 4/2005 | Ferrono et al. ............ 239/332 |

* cited by examiner

Primary Examiner—Darren Gorman (57) ABSTRACT

A water-misting assembly includes a reservoir that has sides defining a chamber with a drain port positioned along a bottom edge thereof and a drain plug insertable therein. A lid coupled to a reservoir top end and wheels are connected to a distal end of the sides. A mechanism is included for extracting water from the chamber. The water-extracting mechanism is detachable from the reservoir. Flexible conduits are connected to the drain port in fluid communication with the chamber. A mechanism is included for supporting one conduit against an elevated support structure. The conduit supporting mechanism includes clips that have a cylindrical bottom portion provided with an open face for clamping onto the one conduit. Each clip includes a top portion that has a vertical hook facing away from the bottom portion open face.

18 Claims, 9 Drawing Sheets

PORTABLE MISTER AND COOLING ASSEMBLY FOR OUTDOOR USE

CROSS REFERENCE TO RELATED APPLICATIONS

This application claims the benefit of U.S. Provisional Application No. 60/683,324, filed May 23, 2005.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to cooling assemblies and, more particularly, to a portable mister and cooling assembly for outdoor use for spraying fluid particulates along a predetermined target zone during extended time periods.

2. Prior Art

Heat can cause substantial discomfort for persons engaged in activities as well as persons who may be relaxing outdoors or even watching the outdoor activities of others. Fire-fighters are exposed to heat stress on the job, which also may be extreme. There are well known techniques to combat the discomfort of heat stress, generally involving one or more of air conditioning (cooling and/or dehumidification), application of water to the person for evaporative cooling, forced air circulation, shade from the sun and so forth. However, in a given situation it can be impractical or impossible to employ such remedies freely. For example, air conditioning and dehumidification are wasteful of energy except in closed spaces; affected persons may not wish to drench themselves to cool off; shade may be unavailable at the desired location, etc.

The typical remedy for heat stress on athletes, spectators, fire-fighters and the like is to provide forced air circulation using fans and/or shade using some form of awning. More complicated solutions, such as providing refrigerated air, are not favored. A unit of sufficient capacity to provide meaningful relief in an open outdoor space would be prohibitively expensive. A permanent installation would be impractical for occasional use, and a temporary installation would require a team of workers to move, set up, operate and maintain. Whether the installation is temporary or permanent, means would be needed either to vent the warm side of the cooling device or to move refrigerated air to the area where needed. Numerous smaller units might be deployed, but this simply multiplies the problems. Such outdoor cooling devices are simply too expensive and inconvenient to acquire, install or store and transport, operate and maintain.

Accordingly, a need remains for a portable mister and cooling assembly for outdoor use in order to overcome the above-noted shortcomings. The present invention satisfies such a need by providing a cooling assembly that is convenient and easy to use, is lightweight yet durable in design, is versatile in its applications, and effectively provides a cool environment with little effort. Such a cooling assembly offers users an effective means for cooling off while playing sports or being engaged in other outdoor activities during hot and humid weather conditions. The assembly advantageously safeguards against the risk of heat exhaustion by providing a cooling water mist that assists in maintaining the user's body hydrated. Since the cooling assembly is portable in design it can conveniently be used in virtually any location or outdoor setting, thus making it very appealing for a variety of applications.

BRIEF SUMMARY OF THE INVENTION

In view of the foregoing background, it is therefore an object of the present invention to provide a portable mister and cooling assembly for outdoor use. These and other objects, features, and advantages of the invention are provided by a water misting assembly for spraying fluid particulates along a predetermined target zone during extended time periods.

The water-misting assembly includes a reservoir that has a plurality of monolithically formed sides defining a water-holding chamber. Such a chamber houses a predetermined volume of water and has a drain port positioned along a bottom edge thereof. The drain port is located at a proximal one of the sides. The reservoir further includes a drain plug that is removably insertable into the drain port for advantageously and effectively preventing air and water from prematurely escaping from the chamber. Such a reservoir also has a lid removably coupled to an open top end thereof.

The lid is nested at an air-tight position with the reservoir during operating conditions. Such a reservoir further includes a plurality of wheels that are directly connected to a distal end of the sides such that the reservoir is easily transported by raising the proximal end of the reservoir and conveniently without forcing water out from the drain port. A plurality of telescopically adjustable anchor stakes may be removably attached to the reservoir. Such stakes have tapered bottom ends for being submerged beneath the ground surface and further have top ends positioned along a vertical support zone.

A mechanism is included for extracting water from the chamber while the reservoir is isolated from an external water supply source. Such a water-extracting mechanism is detachable from the reservoir during transport. The water-extracting mechanism preferably includes a water-distribution manifold disposed to an exterior of the reservoir. Such a manifold is directly affixed to the first conduit and the drain port respectively. The manifold includes an intake port and a plurality of dispensing ports in fluid communication therewith. Each of the dispensing ports has a one-way check valve coupled thereto respectively. The intake port is directly mated to the drain port of the reservoir.

A pneumatic pump is positioned through the lid and terminates within the chamber. Such a pneumatic pump introduces air directly into the chamber. The pneumatic pump preferably includes a piston, a handle directly coupled thereto, and a cylindrical housing. Such a piston is telescopically and repeatedly slidable within the housing for effectively introducing air into the chamber. The reservoir has an initial air-pressure level within the chamber. Such an initial air-pressure level effectively increases when the pneumatic pump introduces air into the chamber such that the water is expelled through the drain port when the manifold and the first conduit is coupled to the drain port.

In an alternate embodiment, the water-extracting mechanism preferably includes a power-operated motor that is seated within the chamber and is spaced from the lid. The first conduit is removably disposed within the chamber. Such a first conduit has opposed ends directly mated to the motor and the drain port of the reservoir such that the first conduit and the manifold effectively maintain direct fluid communication during operating conditions.

A plurality of flexible conduits are removably connected to the drain port and is in fluid communication with the chamber such that the water is effectively channeled through the conduits only if the water-extracting mechanism has been activated. One of the conduits may have a plurality of spaced apertures formed therein. Such a one conduit is removably connected directly to the drain port in such a manner that the water is effectively caused to travel out from the chamber and into the one conduit when the initial pressure level reaches a predetermined threshold air-pressure level, wherein the water is advantageously discharged through the apertures.

A mechanism is included for securely supporting a first one of the conduits against an elevated support structure. Such a conduit supporting mechanism is detachable from the first conduit and the reservoir while the water is flowing out from the reservoir. The reservoir is supported on a ground surface while the first conduit is supported at an elevated position such that the water is effectively discharged downwardly onto the user. The conduit supporting mechanism includes a plurality of clips that have a cylindrical bottom portion provided with an open face for conveniently and effectively clamping onto a portion of the first conduit. Each of the clips further includes a top portion monolithically formed with the bottom portion. Such a top portion has a vertically registered hook facing away from the open face of the bottom portion such that the top portions are engageable along a first plane while the bottom portions are suspended along a second plane. The first and second planes are registered orthogonal to each other.

Each of the clips may further have an axial bore laterally passing through respective lower portions thereof wherein multiple portions of the conduits are intercalated through the bore. The hook shaped top portions of the clips are removably attached to the vertical support regions in such a manner that the multiple conduit portions are adapted to a horizontal path along the vertical support region during misting operations.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this application will be thorough and complete, and will fully convey the true scope of the invention to those skilled in the art. Like numbers refer to like elements throughout the figures and prime numbers refer to an alternate embodiment of such elements.

The assembly of this invention is referred to generally in FIGS. 1-10 by the reference numeral 10 and is intended to provide a portable mister and cooling assembly for outdoor use. It should be understood that the assembly 10 may be used to provide cooling capabilities in many different types of settings and should not be limited in use to only cooling athletes.

Referring initially to FIGS. 1, 2, 3, 4, 6, 7, 8 and 9, the assembly 10 includes a reservoir 20 that has a plurality of monolithically formed sides 21 defining a water-holding chamber 22. Such a chamber 22 houses a predetermined volume of water and has a drain port 23 positioned along a bottom edge 24A thereof. The drain port 23 is located at a proximal one 21A of the sides 21. The reservoir 20 further includes a drain plug 25 that is removably insertable into the drain port 23, which is essential and advantageous for effectively preventing air and water from prematurely escaping from the chamber 22. Such a reservoir 20 also has a lid 26 removably coupled to an open top end 24B thereof.

The lid 26 is nested at an air-tight position with the reservoir 20 during operating conditions. Such a reservoir 20 further includes a plurality of wheels 27 that are directly connected, without the use of intervening elements, to a distal one 21B of the sides 21, which is crucial and convenient such that the reservoir 20 is easily transported by raising the proximal end 21A of the reservoir 20 and conveniently without forcing water out from the drain port 23. A plurality of telescopically adjustable anchor stakes 28 are removably attached to the reservoir 20. Such stakes 28 have tapered bottom ends 29A for being submerged beneath the ground surface and further have top ends 29B positioned along a vertical support zone.

Figure 10:
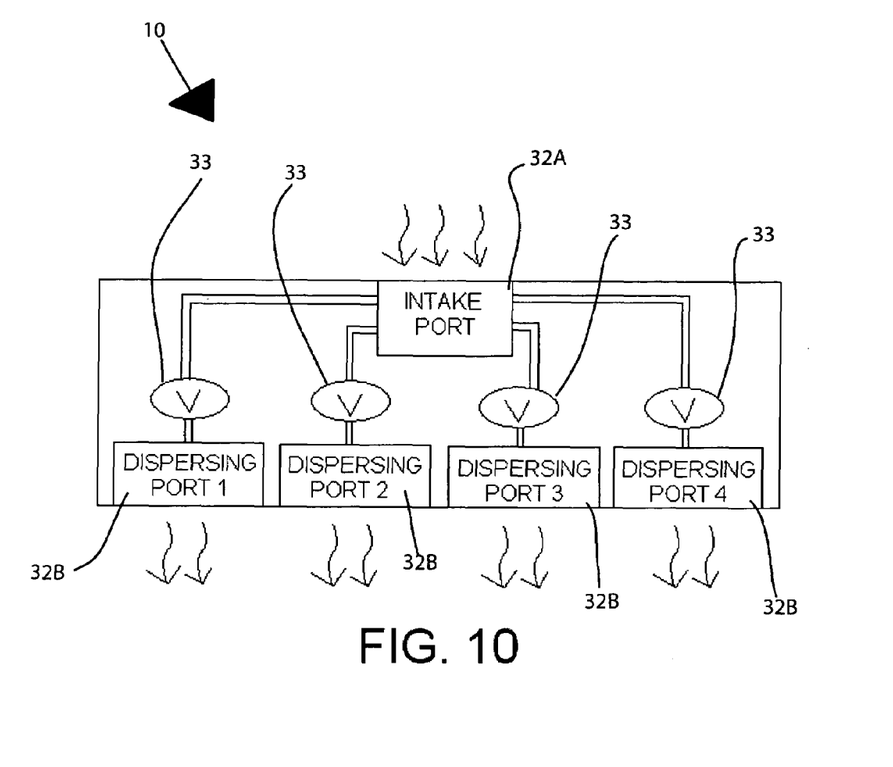
FIG. 10 is a schematic block diagram of the water-distribution manifold shown in FIG. 6.

Referring to FIGS. 1, 2, 3, 4, 6, 7, 9 and 10 a mechanism 30 is included for extracting water from the chamber 22 while the reservoir 20 is isolated from an external water supply source. Such a water-extracting mechanism 30 is detachable from the reservoir 20 during transport, which is important for reducing the likelihood of the water-extracting mechanism 30 being damaged during transport. The water-extracting mechanism 30 includes a water-distribution manifold 31 disposed to an exterior of the reservoir 20. Such a manifold 31 is directly affixed, without the use of intervening elements, to the first conduit 37A (described herein below) and the drain port 23 respectively. The manifold 31 includes an intake port 32A and a plurality of dispensing ports 32B in fluid communication therewith. Each of the dispensing ports 32B has a one-way check valve 33 coupled thereto respectively, as is best shown in FIG. 10. The intake port 32A is directly mated, without the use of intervening elements, to the drain port 23 of the reservoir 20.

A pneumatic pump 34 is positioned through the lid 26 and terminates within the chamber 22. Such a pneumatic pump 34 introduces air directly into the chamber 22. The pneumatic pump 34 includes a piston 35A, a handle 35B directly coupled thereto, without the use of intervening elements, and a cylindrical housing 36. Such a piston 35A is telescopically and repeatedly slidable within the housing 36, which is vital for effectively introducing air into the chamber 22. The reservoir 20 has an initial air-pressure level within the chamber 22. Such an initial air-pressure level effectively increases when the pneumatic pump 34 introduces air into the chamber 22, which is critical such that the water is expelled through the drain port 23 when the manifold 31 and the first conduit 37A are coupled to the drain port 23.

Figure 8:
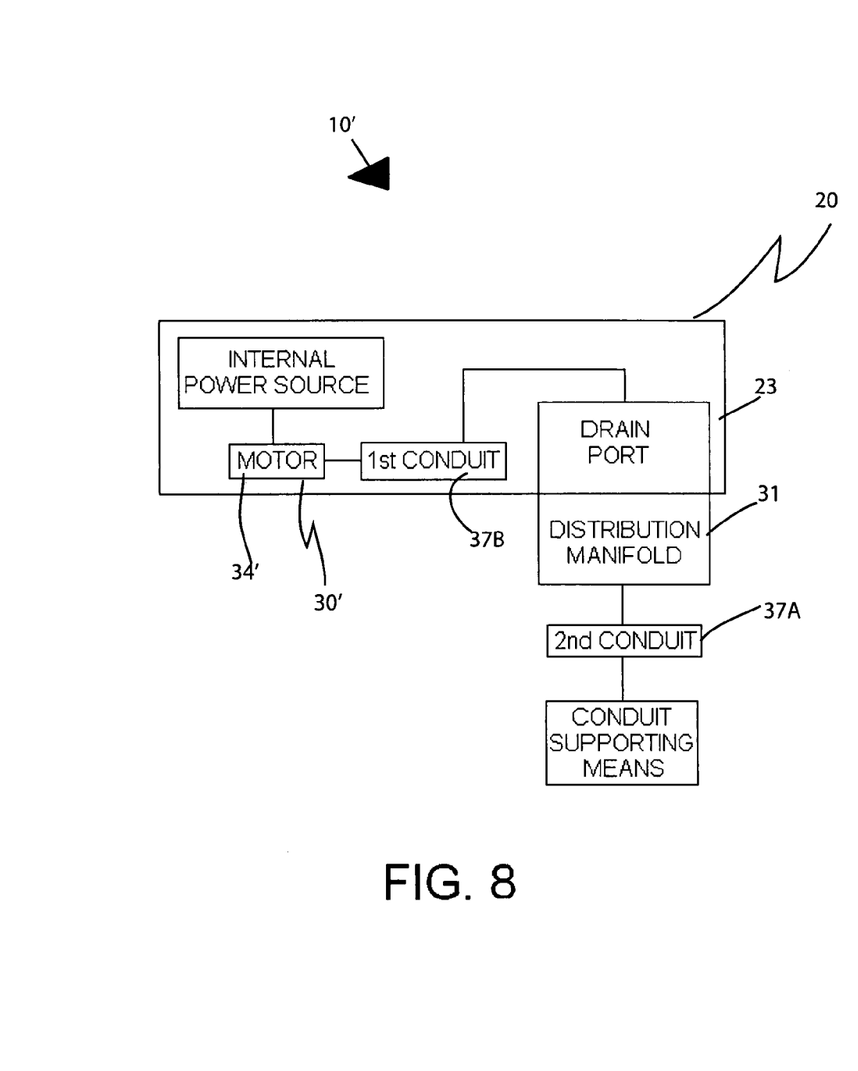
FIG. 8 is a schematic block diagram showing an alternate embodiment water-extracting mechanism shown in FIGS. 1 through 7.
Figure 9:
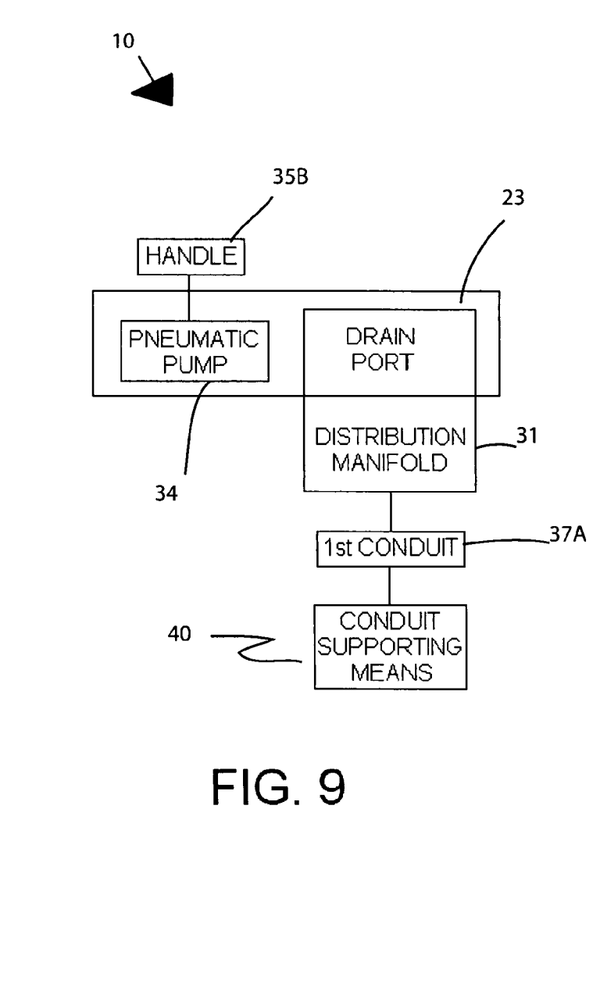
FIG. 9 is a schematic block diagram of the water-extracting mechanism shown in FIGS. 1 through 7.

Referring to FIG. 8, in an alternate embodiment 10', the water-extracting mechanism 30' includes a power-operated motor 34' that is seated within the chamber 22 and is spaced from the lid 26. A second conduit 37B is removably disposed within the chamber 22. Such a second conduit 37B has opposed ends 39 directly mated, without the use of intervening elements, to the motor 34' and the drain port 23 of the reservoir 20, which is important such that the first conduit 37A and the manifold 31 effectively maintain direct fluid communication during operating conditions. The first conduit 37A is removably attachable to the distribution manifold 31 and the conduit supporting means 40.

Referring to FIGS. 1, 2, 3, 5, 8 and 9, a plurality of flexible conduits 37 are removably connected to the drain port 23 and is in fluid communication with the chamber 22, which is vital such that the water is effectively channeled through the conduits 37 only if the water-extracting mechanism 30 has been activated. A first one of the conduits 37A has a plurality of spaced apertures 38 formed therein. Such a first conduit 37A is removably connected directly, without the use of intervening elements, to the drain port 23 in such a manner that the water is effectively caused to travel out from the chamber 22 and into the first conduit 37A when the initial pressure level reaches a predetermined threshold air-pressure level, wherein the water is advantageously discharged through the apertures 38.

Referring to FIGS. 1, 5, 8 and 9, a mechanism 40 is included for securely supporting a first one 37A of the conduits 37 against an elevated support structure 11. Such a conduit supporting mechanism 40 is detachable from the first conduit 37A and the reservoir 20 while the water is flowing out from the reservoir 20. The reservoir 20 is supported on a ground surface 12 while the first conduit 37A is supported at an elevated position such that the water is effectively discharged downwardly onto the user. The conduit supporting mechanism 40 includes a plurality of clips 41 that have a cylindrical bottom portion 42A provided with an open face 43 that is crucial for conveniently and effectively clamping onto a portion of the first conduit 37A.

Figure 1:
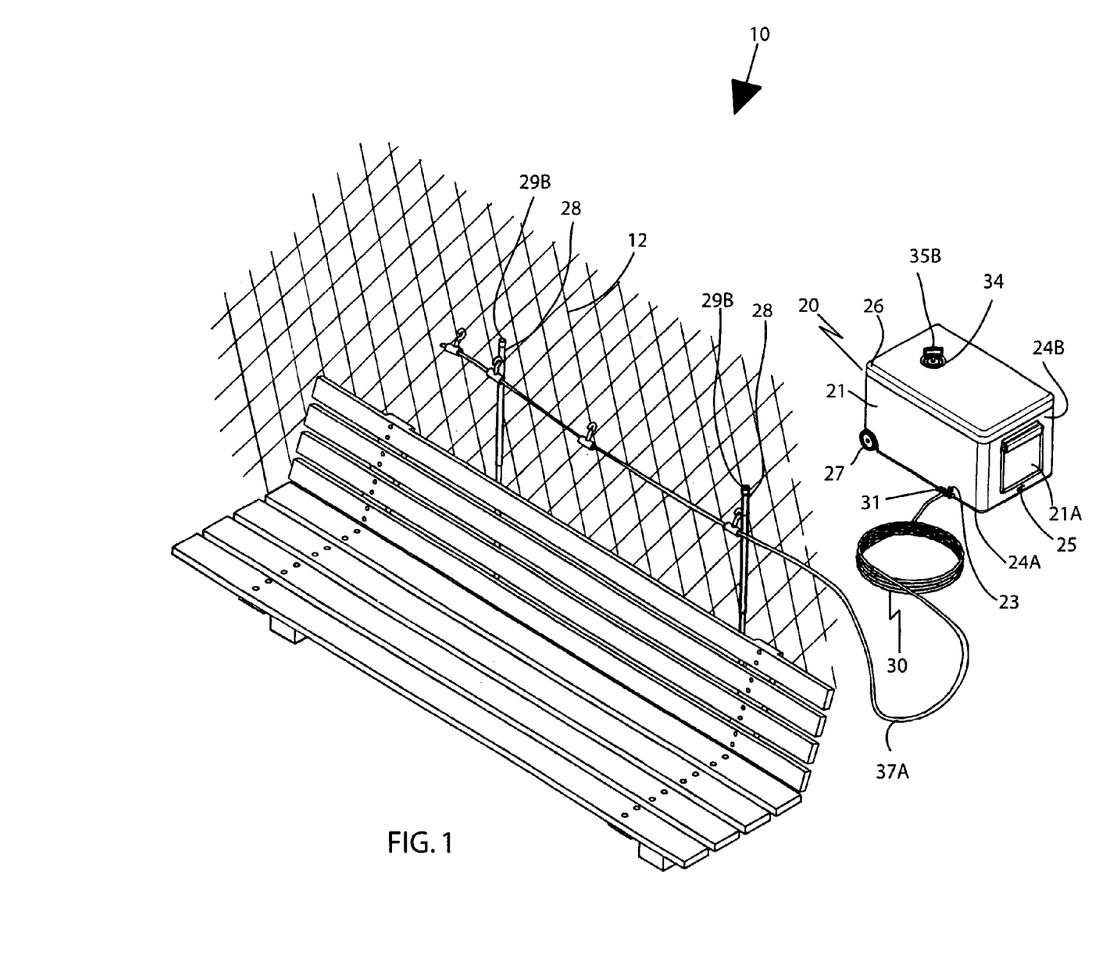
FIG. 1 is a perspective view showing a portable mister and cooling assembly for outdoor use, in accordance with the present invention.
Figure 2:
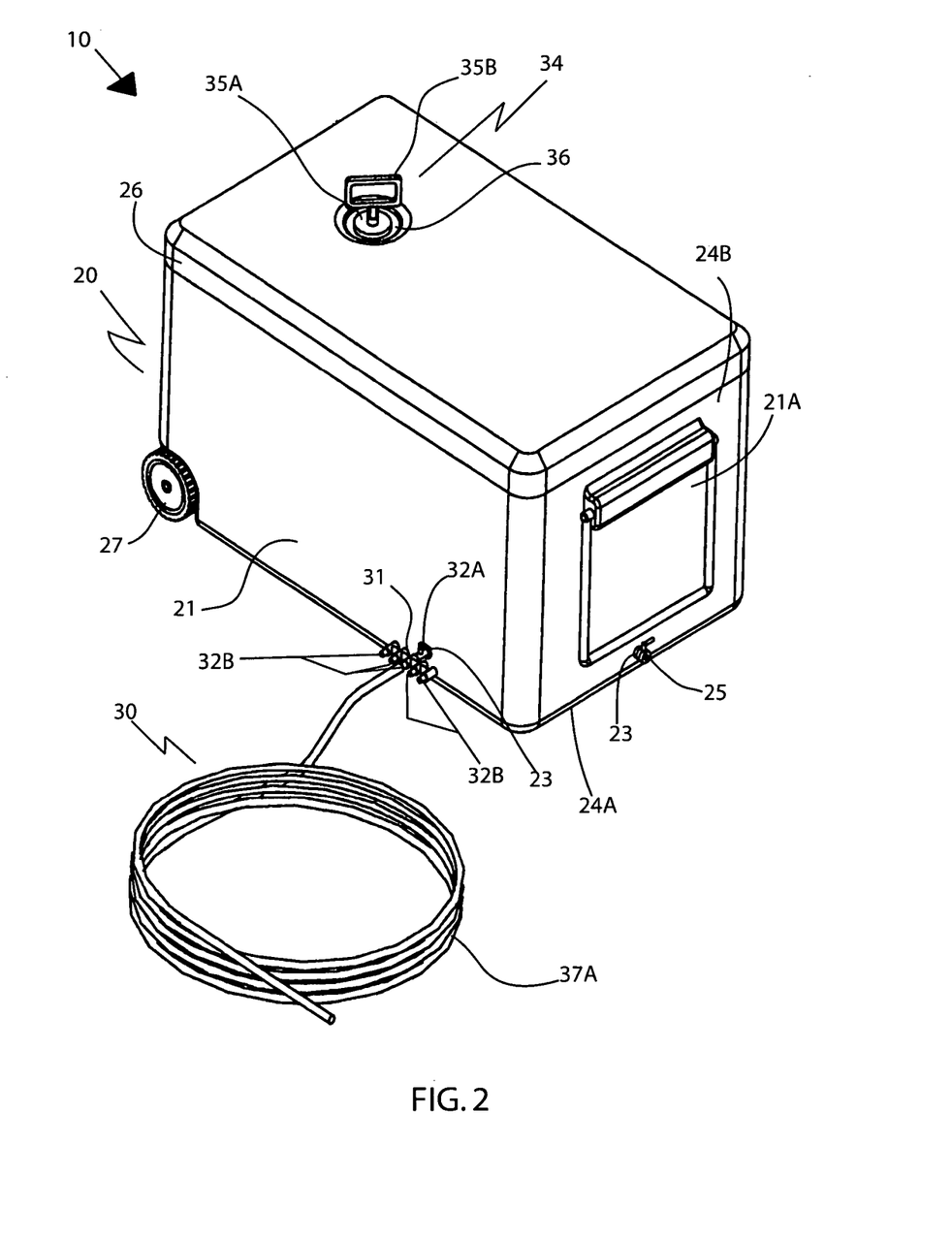
FIG. 2 is an enlarged perspective view of the reservoir shown in FIG. 1.
Figure 3:
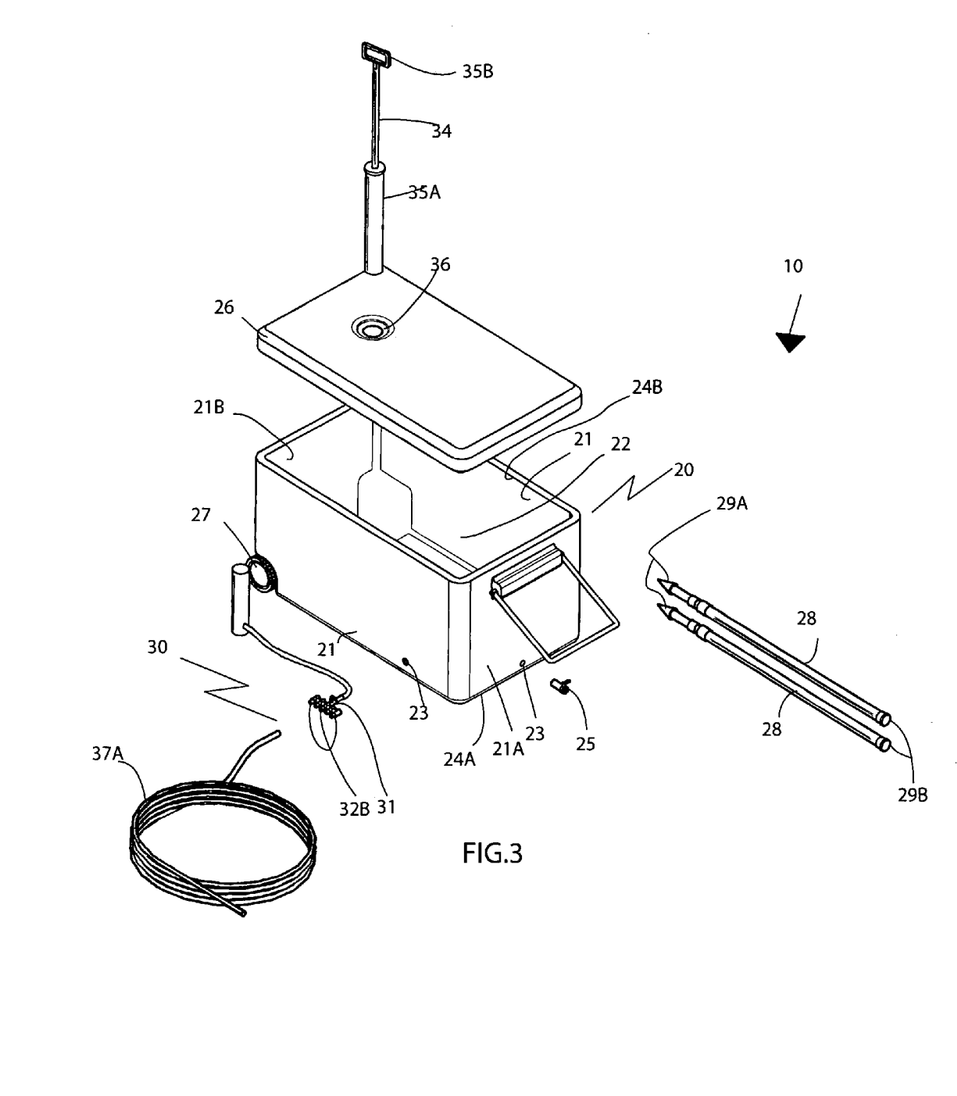
FIG. 3 is an exploded perspective view of the assembly shown in FIG. 1
Figure 4:
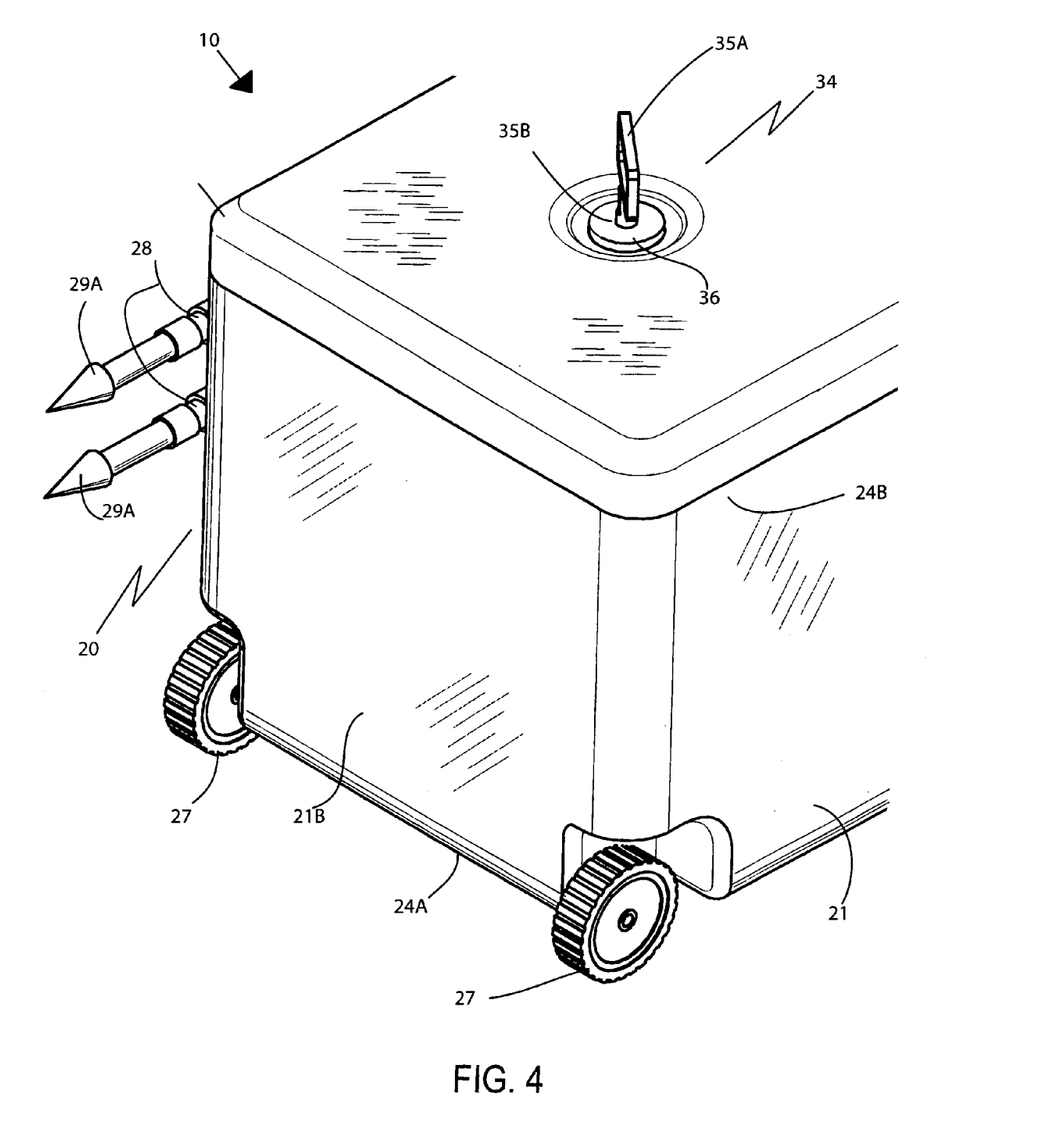
FIG. 4 is an enlarged perspective view of the reservoir distal end shown in FIG. 1, showing the wheels attached thereto.
Figure 5:
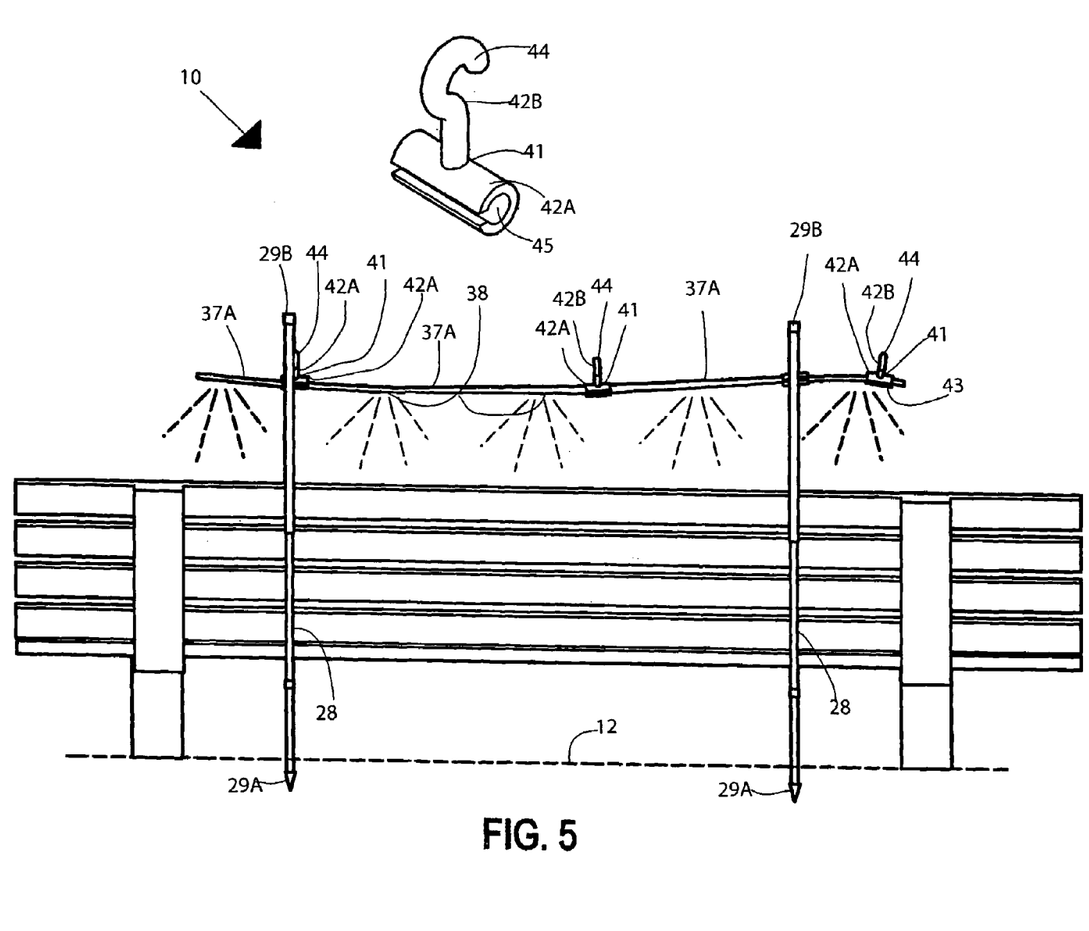
FIG. 5 is a rear-elevational view of the conduit supporting mechanism shown in FIG. 1, showing an enlarged perspective view of one clip.
Figure 6:
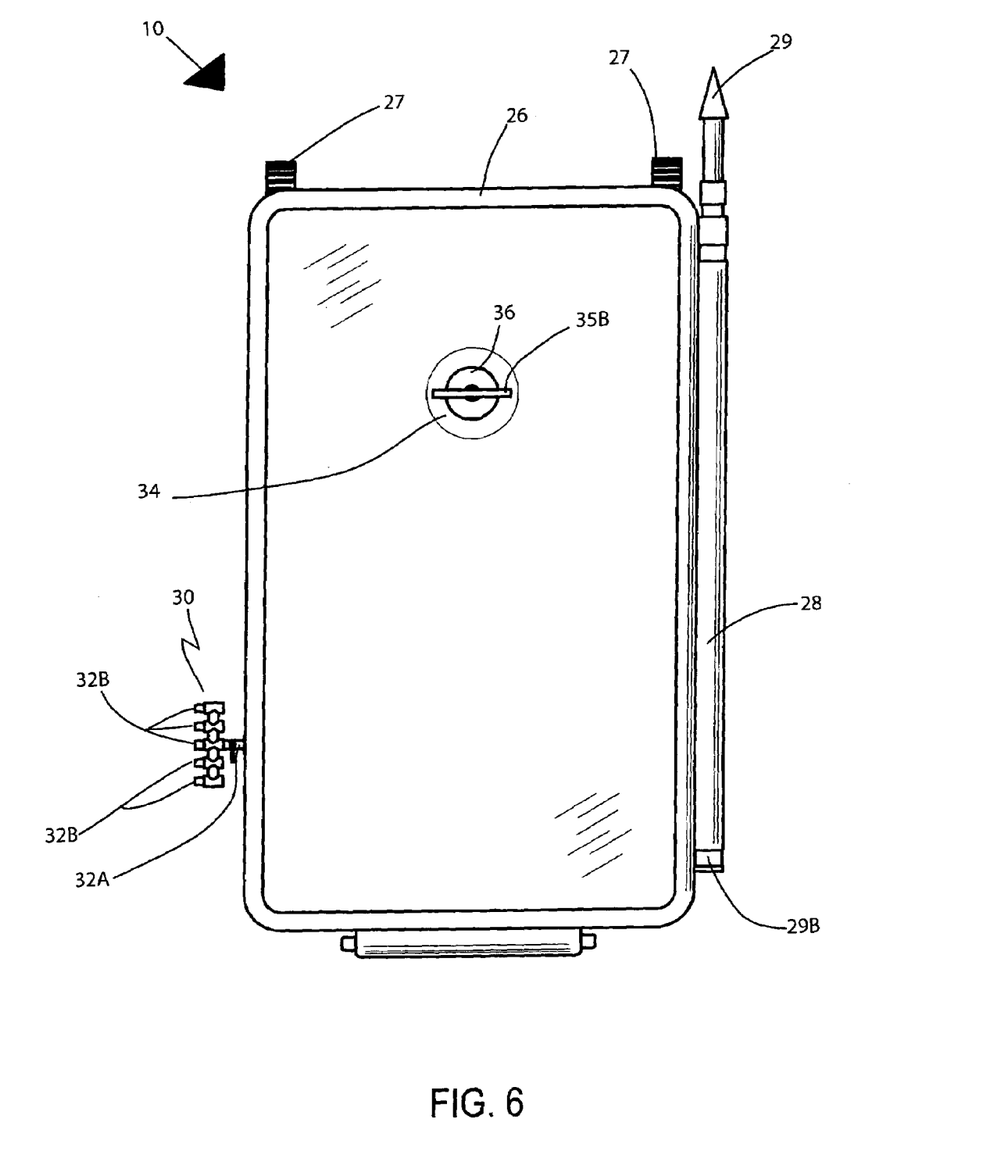
FIG. 6 is a top plan view of the assembly shown in FIG. 2.
Figure 7:
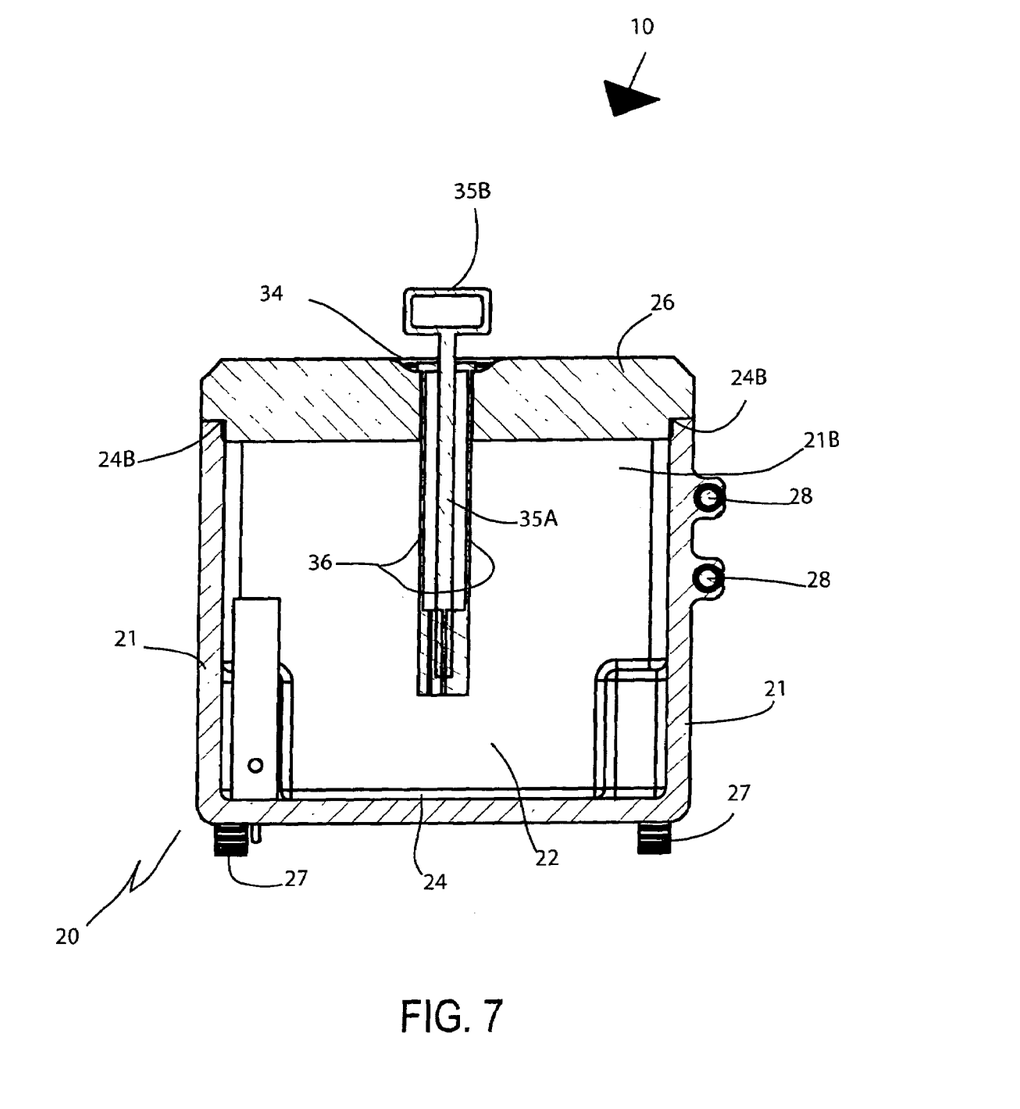
FIG. 7 is a cross-sectional view of the reservoir shown in FIG. 6, taken along line 7-7.

Referring to FIGS. 1 and 5, each of the clips 41 further includes a top portion 42B monolithically formed with the bottom portion 42A. Such a top portion 42B has a vertically registered hook 44 facing away from the open face 43 of the bottom portion 42A, which is vital such that the top portions 42B are engageable along a first plane while the bottom portions 42A are suspended along a second plane. The first and second planes are registered orthogonal to each other. Each of the clips 41 further has an axial bore 45 laterally passing through the respective bottom portions 42A thereof wherein multiple portions of the conduits 37 are intercalated through the bore 45. The hook shaped top portions 42B of the clips 41 are removably attached to the vertical support regions 11 in such a manner that the multiple conduit portions 37 are adapted to a horizontal path along the vertical support region 11 during misting operations. Of course, the conduits 37 may be oriented along a variety of alternate paths like a vertical, orthogonal or oscillating path, depending on the user's needs, as is obvious to a person of ordinary skill in the art.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to first skilled in the art.

What is claimed as new and what is desired to secure by Letters Patent of the United States is:

1. A water misting assembly for spraying fluid particulates along a predetermined target zone during extended time periods, said water-misting assembly comprising:
   a reservoir having a plurality of monolithically formed sides defining a water-holding chamber, said chamber housing a predetermined volume of water and having a drain port positioned along a bottom edge thereof;
   means for extracting water from said chamber while said reservoir is isolated from an external water supply source;
   a plurality of flexible conduits removably connected to said drain port and being in fluid communication with said chamber such that the water is channeled through said conduits only if said water-extracting means has been activated; and
   means for securely supporting a first one of said conduits against an elevated support structure, said conduit supporting means being detachable from said first conduit and said reservoir while the water is flowing out from said reservoir, said reservoir being supported on a ground surface while said first conduit is supported at an elevated position such that the water is discharged downwardly onto the user, said conduit supporting means comprising a plurality of clips having a cylindrical bottom portion provided with an open face for clamping onto a portion of said first conduit, each of said clips further including a top portion monolithically formed with said bottom portion, said top portion having a vertically registered hook facing away from said open face of said bottom portion such that said top portion are engageable along a first plane while said bottom portions are suspended along a second plane, said first and second planes being registered orthogonal to each other.

2. The assembly of claim 1, wherein said water-extracting means comprising:
   a water-distribution manifold disposed exterior of said reservoir, said manifold being directly affixed to said first conduit and said drain port respectively, said manifold including an intake port and a plurality of dispensing ports in fluid communication therewith, each of said dispensing ports having a one-way check valve coupled thereto respectively, said intake port being directly mated to said drain port of said reservoir; and
   a power-operated motor seated within said chamber and spaced from said lid.

3. The assembly of claim 1, wherein said water-extracting means comprises:
   a pneumatic pump terminating within said chamber, said pneumatic pump introducing air directly into said chamber, said reservoir having an initial air-pressure level within said chamber, said initial air-pressure level increasing when said pneumatic pump introduces air into said chamber such that the water is expelled through said drain port.

4. The assembly of claim 3, wherein one of said conduits has a plurality of spaced apertures formed therein, said one conduit being removably connected directly to said drain port in such a manner that said water is caused to travel out from said chamber and into said one conduit when said initial pressure level reaches a predetermined threshold air-pressure level, wherein the water is discharged through said apertures.

5. The assembly of claim 3, wherein said pneumatic pump comprises;
   a piston and a handle directly coupled thereto; and
   a cylindrical housing, wherein said piston is telescopically and repeatedly slidable within said housing for introducing air into said chamber.

6. The assembly of claim 1, further comprising a plurality of telescopically adjustable anchor stakes removably attached to said reservoir, said stakes having tapered bottom ends for being submerged beneath the ground surface and further having top ends positioned along a vertical support zone, each of said clips having an axial bore laterally passing through respective lower portions thereof wherein multiple portions of said conduits are intercalated through said bore, said hook shaped top portions of said clips being removably attached to said vertical support zone in such a manner that said multiple conduit portions are adapted to a horizontal path along said vertical support region during misting operations.

7. A water misting assembly for spraying fluid particulates along a predetermined target zone during extended time periods, said water-misting assembly comprising:
   a reservoir having a plurality of monolithically formed sides defining a water-holding chamber, said chamber housing a predetermined volume of water and having a drain port positioned along a bottom edge thereof, wherein said drain port is located at a proximal one of said sides, said reservoir further including a drain plug removably insertable into said drain port for preventing air and water from prematurely escaping from said chamber, said reservoir further having a lid removably coupled to an open top end thereof, said lid being nested at an air-tight position with said reservoir during operating conditions, said reservoir further including a plurality of wheels directly connected to a distal end of said sides such that said reservoir is easily transported by raising said proximal end of said reservoir and without forcing water out from said drain port;
   means for extracting water from said chamber while said reservoir is isolated from an external water supply source;
   a plurality of flexible conduits removably connected to said drain port and being in fluid communication with said chamber such that the water is channeled through said conduits only if said water-extracting means has been activated; and
   means for securely supporting a first one of said conduits against an elevated support structure, said conduit supporting means being detachable from said first conduit and said reservoir while the water is flowing out from said reservoir, said reservoir being supported on a ground surface while said first conduit is supported at an elevated position such that the water is discharged downwardly onto the user, said conduit supporting means comprising a plurality of clips having a cylindrical bottom portion provided with an open face for clamping onto a portion of said first conduit, each of said clips further including a top portion monolithically formed with said bottom portion, said top portion having a vertically registered hook facing away from said open face of said bottom portion such that said top portion are engageable along a first plane while said bottom portions are suspended along a second plane, said first and second planes being registered orthogonal to each other.

8. The assembly of claim 7, wherein said water-extracting means comprising:
   a water-distribution manifold disposed exterior of said reservoir, said manifold being directly affixed to said first conduit and said drain port respectively, said manifold including an intake port and a plurality of dispensing ports in fluid communication therewith, each of said dispensing ports having a one-way check valve coupled thereto respectively, said intake port being directly mated to said drain port of said reservoir;
   a power-operated motor seated within said chamber and spaced from said lid; and
   said first conduit being removably disposed within said chamber, said first conduit having opposed ends directly mated to said motor and said drain port of said reservoir such that said first conduit and said manifold maintain directly fluid communication during operating conditions.

9. The assembly of claim 7, wherein said water-extracting means comprises:
   a pneumatic pump positioned through said lid and terminating within said chamber, said pneumatic pump introducing air directly into said chamber, said reservoir having an initial air-pressure level within said chamber, said initial air-pressure level increasing when said pneumatic pump introduces air into said chamber such that the water is expelled through said drain port.

10. The assembly of claim 7, wherein one of said conduits has a plurality of spaced apertures formed therein, said one conduit being removably connected directly to said drain port in such a manner that said water is caused to travel out from said chamber and Into said one conduit when said initial pressure level reaches a predetermined threshold air-pressure level, wherein the water is discharged through said apertures.

11. The assembly of claim 9, wherein said pneumatic pump comprises:
a piston and a handle directly coupled thereto; and
a cylindrical housing, wherein said piston is telescopically and repeatedly slidable within said housing for introducing air into said chamber.

12. The assembly of claim 7, further comprising a plurality of telescopically adjustable anchor stakes removably attached to said reservoir, said stakes having tapered bottom ends for being submerged beneath the ground surface and further having top ends positioned along a vertical support zone, each of said clips having an axial bore laterally passing through respective lower portions thereof wherein multiple portions of said conduits are intercalated through said bore, said hook shaped top portions of said clips being removably attached to said vertical support zone in such a manner that said multiple conduit portions are adapted to a horizontal path along said vertical support region during misting operations.

13. A water misting assembly for spraying fluid particulates along a predetermined target zone during extended time periods, said water-misting assembly comprising:
a reservoir having a plurality of monolithically formed sides defining a water-holding chamber, said chamber housing a predetermined volume of water and having a drain port positioned along a bottom edge thereof, wherein said drain port is located at a proximal one of said sides, said reservoir further including a drain plug removably insertable into said drain port for preventing air and water from prematurely escaping from said chamber, said reservoir further having a lid removably coupled to an open top end thereof, said lid being nested at an air-tight position with said reservoir during operating conditions, said reservoir further including a plurality of wheels directly connected to a distal end of said sides such that said reservoir is easily transported by raising said proximal end of said reservoir and without forcing water out from said drain port;
means for extracting water from said chamber while said reservoir is isolated from an external water supply source, wherein said water-extracting means is detachable from said reservoir during transport;
a plurality of flexible conduits removably connected to said drain port and being in fluid communication with said chamber such that the water is channeled through said conduits only if said water-extracting means has been activated; and
means for securely supporting a first one of said conduits against an elevated support structure, said conduit supporting means being detachable from said first conduit and said reservoir while the water is flowing out from said reservoir, said reservoir being supported on a ground surface while said first conduit is supported at an elevated position such that the water is discharged downwardly onto the user, said conduit supporting means comprising a plurality of clips having a cylindrical bottom portion provided with an open face for clamping onto a portion of said first conduit, each of said clips further including a top portion monolithically formed with said bottom portion, said top portion having a vertically registered hook facing away from said open face of said bottom portion such that said top portion are engageable along a first plane while said bottom portions are suspended along a second plane, said first and second planes being registered orthogonal to each other.

14. The assembly of claim 13, wherein said water-extracting means comprising:
a water-distribution manifold disposed exterior of said reservoir, said manifold being directly affixed to said first conduit and said drain port respectively, said manifold including an intake port and a plurality of dispensing ports in fluid communication therewith, each of said dispensing ports having a one-way check valve coupled thereto respectively, said intake port being directly mated to said drain port of said reservoir;
a power-operated motor seated within said chamber and spaced from said lid; and
said first conduit being removably disposed within said chamber, said first conduit having opposed ends directly mated to said motor and said drain port of said reservoir such that said first conduit and said manifold maintain directly fluid communication during operating conditions.

15. The assembly of claim 13, wherein said water-extracting means comprises:
a pneumatic pump positioned through said lid and terminating within said chamber, said pneumatic pump introducing air directly into said chamber, said reservoir having an initial air-pressure level within said chamber, said initial air-pressure level increasing when said pneumatic pump introduces air into said chamber such that the water is expelled through said drain port.

16. The assembly of claim 15, wherein one of said conduits has a plurality of spaced apertures formed therein, said one conduit being removably connected directly to said drain port in such a manner that said water is caused to travel out from said chamber and into said one conduit when said initial pressure level reaches a predetermined threshold air-pressure level, wherein the water is discharged through said apertures.

17. The assembly of claim 15, wherein said pneumatic pump comprises:
a piston and a handle directly coupled thereto; and
a cylindrical housing, wherein said piston is telescopically and repeatedly slidable within said housing for introducing air into said chamber.

18. The assembly of claim 13, further comprising a plurality of telescopically adjustable anchor stakes removably attached to said reservoir, said stakes having tapered bottom ends for being submerged beneath the ground surface and further having top ends positioned along a vertical support zone, each of said clips having an axial bore laterally passing through respective lower portions thereof wherein multiple portions of said conduits are intercalated through said bore, said hook shaped top portions of said clips being removably attached to said vertical support zone in such a manner that said multiple conduit portions are adapted to a horizontal path along said vertical support region during misting operations.

* * * * *